US008739285B1

(12) United States Patent
Andruss et al.

(10) Patent No.: US 8,739,285 B1
(45) Date of Patent: *May 27, 2014

(54) DIFFERENTIAL VIRUS SCAN

(75) Inventors: William D. Andruss, Minneapolis, MN (US); Christopher H. Claudatos, San Jose, CA (US); Bruce D. Leetch, Mason, OH (US); Steven R. Terwilliger, Foster City, CA (US)

(73) Assignee: EMC Corporation, Hopkinton, MA (US)

( * ) Notice: Subject to any disclaimer, the term of this patent is extended or adjusted under 35 U.S.C. 154(b) by 231 days.

This patent is subject to a terminal disclaimer.

(21) Appl. No.: 12/909,089

(22) Filed: Oct. 21, 2010

Related U.S. Application Data

(63) Continuation of application No. 11/395,441, filed on Mar. 31, 2006, now Pat. No. 7,854,006.

(51) Int. Cl.
G06F 11/00 (2006.01)
G06F 12/14 (2006.01)
G06F 12/16 (2006.01)
G08B 23/00 (2006.01)
H04L 29/06 (2006.01)
G06F 21/56 (2013.01)
G06F 11/30 (2006.01)

(52) U.S. Cl.
CPC ............ *H04L 63/145* (2013.01); *G06F 21/56* (2013.01); *G06F 21/566* (2013.01); *G06F 21/564* (2013.01); *G06F 21/562* (2013.01)
USPC ................ 726/24; 726/23; 726/22; 713/187; 713/188

(58) Field of Classification Search
CPC ....... H04I 63/145; G06F 21/56; G06F 21/566; G06F 21/564; G06F 21/562
USPC ................. 713/153–154, 187–188, 193, 194; 726/1, 13, 22–33; 709/206, 249, 389
See application file for complete search history.

(56) References Cited

U.S. PATENT DOCUMENTS

| | | | |
|---|---|---|---|
| 5,473,769 A | 12/1995 | Cozza | |
| 6,718,469 B2 | 4/2004 | Pak et al. | |
| 6,748,534 B1 | 6/2004 | Gryaznov et al. | |
| 6,763,466 B1 | 7/2004 | Glover | |
| 6,802,012 B1 * | 10/2004 | Smithson et al. | 726/24 |
| 6,842,861 B1 | 1/2005 | Cox et al. | |
| 6,952,776 B1 | 10/2005 | Chess | |
| 7,043,634 B2 | 5/2006 | Wolff et al. | |
| 7,203,960 B1 * | 4/2007 | Painter | 726/22 |

(Continued)

OTHER PUBLICATIONS

U.S. Appl. No. 11/395,755, filed Mar. 31, 2006, Andruss, William Dale.

(Continued)

*Primary Examiner* — Evans Desroisiers
(74) *Attorney, Agent, or Firm* — Theodore A. Chen; Krishnendu Gupta

(57) ABSTRACT

Differential scanning is disclosed. A scan collection period is determined. A system is monitored to detect object events during the scan collection period, and a scan list may be updated with information regarding objects to be scanned, based on some of the object events. Objects are scanned based on the information in the scan list. Information regarding objects associated with object events occurring outside the scan collection period may be removed from the scan list.

20 Claims, 4 Drawing Sheets

(56) References Cited

U.S. PATENT DOCUMENTS

| | | | |
|---|---|---|---|
| 7,251,830 | B1 | 7/2007 | Melchione |
| 7,337,471 | B2 | 2/2008 | Nachenberg et al. |
| 7,469,419 | B2 | 12/2008 | Sobel |
| 7,472,422 | B1 * | 12/2008 | Agbabian .................. 726/25 |
| 7,475,427 | B2 | 1/2009 | Palliyil et al. |
| 7,496,960 | B1 | 2/2009 | Chen et al. |
| 7,533,272 | B1 | 5/2009 | Gordon et al. |
| 7,540,027 | B2 | 5/2009 | Achanta et al. |
| 7,716,737 | B2 * | 5/2010 | Wilken et al. .............. 726/22 |
| 7,756,834 | B2 * | 7/2010 | Masters et al. ............. 726/22 |
| 7,854,006 | B1 * | 12/2010 | Andruss et al. ............. 726/24 |
| 8,087,084 | B1 * | 12/2011 | Andruss et al. ............. 726/24 |
| 8,122,507 | B1 * | 2/2012 | Andruss et al. ............. 726/24 |
| 8,205,261 | B1 * | 6/2012 | Andruss et al. ............. 726/24 |
| 8,375,451 | B1 * | 2/2013 | Andruss et al. ............. 726/24 |
| 8,443,445 | B1 * | 5/2013 | Andruss et al. ............. 726/24 |
| 2003/0046611 | A1 | 3/2003 | Muttik et al. |
| 2003/0074574 | A1 | 4/2003 | Hursey et al. |
| 2004/0068663 | A1 | 4/2004 | Sobel |
| 2004/0153666 | A1 | 8/2004 | Sobel |
| 2004/0158730 | A1 | 8/2004 | Sarkar |
| 2005/0132205 | A1 | 6/2005 | Palliyil et al. |
| 2005/0177868 | A1 | 8/2005 | Kwan |
| 2006/0037079 | A1 * | 2/2006 | Midgley .................... 726/24 |
| 2006/0072144 | A1 | 4/2006 | Dowling et al. |
| 2006/0236398 | A1 | 10/2006 | Trakic et al. |
| 2007/0101432 | A1 | 5/2007 | Carpenter |
| 2007/0220607 | A1 | 9/2007 | Sprosts et al. |
| 2007/0266436 | A1 | 11/2007 | Ballard et al. |
| 2009/0094698 | A1 | 4/2009 | Nichols et al. |
| 2010/0049860 | A1 | 2/2010 | Kouvelas et al. |

OTHER PUBLICATIONS

U.S. Appl. No. 11/477,635, filed Jun. 28, 2006, Andruss, William Dale.

U.S. Appl. No. 11/477,634, filed Jun. 28, 2006, Andruss, William Dale.

U.S. Appl. No. 11/477,216, filed Jun. 28, 2006, Andruss, William Dale.

U.S. Appl. No. 11/395,441, filed Mar. 31, 2006, Andruss, William Dale.

U.S. Appl. No. 12/909,089, filed Oct. 21, 2010, Andruss, William Dale.

www.shareconnection.com/sauver-personal.htm which is an archive page from Aug. 31, 2004 of a description from CDMWORLD, printed out in 2009.

www.shareconnection.com/addriller.htm which is an archive page from Jun. 10, 2004 of a description from CDMWORLD, printed out in 2009.

Nachenberg, Computer Virus-Antivirus Coevolution, Communications of the ACM, vol. 40, No. 1, pp. 46-51, Jan. 1997.

U.S. Appl. No. 11/395,441, filed Mar. 31, 2006, Andruss et al.

U.S. Appl. No. 11/477,635, filed Jun. 28, 2006, Andruss et al.

U.S. Appl. No. 11/477,634, filed Jun. 28, 2006, Andruss et al.

U.S. Appl. No. 11/477,216, filed Jun. 28, 2006, Andruss et al.

U.S. Appl. No. 11/395,755, filed Mar. 31, 2006, Andruss et al.

MRSI: A Fast Pattern Matching Algorithm for Anti-virus Applications Xin Zhou; Bo Xi; Yaxuan Qi; Jun Li; Networking, 2008. ICN 2008, Seventh International Conference on Publication Year: 2008, pp. 256-261.

Virus Scan System Based on Hardware-Acceleration Baojun Zhang; Jiebing Wang; Xuezeng Pan; Computer and Computational Sciences, 2007. IMSCCS 2007. Second International Multi-Symposiums on Publication Year: 2007, pp. 344-351.

Hash-AV: fast virus signature scanning by cache-resident filters; Erdogan, O.; Pei Cao; Global Telecommunications Conference, 2005. Globecom '05. IEEE; pp. 1767-1762 vol. 3; Publication Year: 2005.

* cited by examiner

DIFFERENTIAL VIRUS SCAN

CROSS REFERENCE TO OTHER APPLICATIONS

This application is a continuation of U.S. patent application Ser. No. 11/395,441 filed on Mar. 31, 2006, entitled DIFFERENTIAL VIRUS SCAN, the contents and teachings of which are hereby incorporated by reference herein.

This application is related to co-pending U.S. patent application Ser. No. 11/395,755 filed on Mar. 31, 2006, entitled INCREMENTAL VIRUS SCAN, the contents and teachings of which are hereby incorporated by reference herein.

FIELD OF THE INVENTION

This invention relates generally to scanning objects, and more particularly to systems and methods for efficient scanning of a file or object repository for viruses.

BACKGROUND OF THE INVENTION

This invention relates to a system and method for scanning computer files and/or objects for computer viruses. In the context of computers and machines, a virus is a self-replicating/self-reproducing-automation program that spreads by inserting copies of itself into other executable code or documents.

Computer antivirus programs are commonly used to detect, clean, and remove computer viruses from infected objects such as data files. One form of detection typically used is file scanning of files resident on a hosting computer system's storage device(s). Files are scanned for the presence of an embedded virus, and the scanning may be either signature-based or heuristic (such as watching for suspicious behavior). However, virus scanning consumes significant processing cycles on the hosting computer, as well as increasing loads on the storage device being scanned.

Current antivirus products support on demand, on access, and on schedule scan operations. Scheduled scan operations scan a selected set of targets that may include all files residing on all storage devices (such as hard drives) attached to the computer platform being scanned. Filtering techniques for target selection are typically very limited, however. The user can manually enter a list of named files or select full hard drives for the scheduled scan. Manually entering a long list of named files is time consuming, and may require frequent manual updates by the user as the contents of the storage devices change. Further, a scheduled scan of all hard drive contents degrades the performance of the computer platform for a long period of time. All resources involved in a scan will be affected during the scan. For example, if the scan is being performed over a network, scanning all storage devices increases network utilization with consequent possible decrease in network performance.

Because antivirus scan operations degrade the host computer platform performance during the period of time that the scan operation is executing, it is desirable to shorten the scan operation period. If the scan operation period is shortened, the computer will be subject to less performance degradation—either lower load while scanning, or scanning for a shorter period of time. It is also desirable to shorten the scan operation period without weakening protection of the host computer platform.

There is a need, therefore, for an improved method, article of manufacture, and apparatus for efficiently detecting viruses on a computer system.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

An embodiment of the invention will be described with reference to a computer system on which an antivirus scanning program executes, but it should be understood that the principles of the invention are not limited to this particular configuration. Rather, they may be applied to any system in which files or objects are scanned, either on a local or remote device, and the device may comprise one or more storage devices. Although the scanning methods herein are described in terms of their application to antivirus scanning, one skilled in the art will recognize that they are equally applicable to other cases for which it is desirable to scan files or objects periodically. Disclosed herein are a method and system to perform scan operations on storage devices in a manner that reduces performance degradation resulting from scanning, by reducing the number of files or objects needing to be scanned. This reduction is accomplished without increasing the risk of virus infection (i.e., a virus has penetrated a computer system and inserted itself into an object, such as a data file, hosted by the computer) or damage to the host computer system being scanned.

Figure 1:
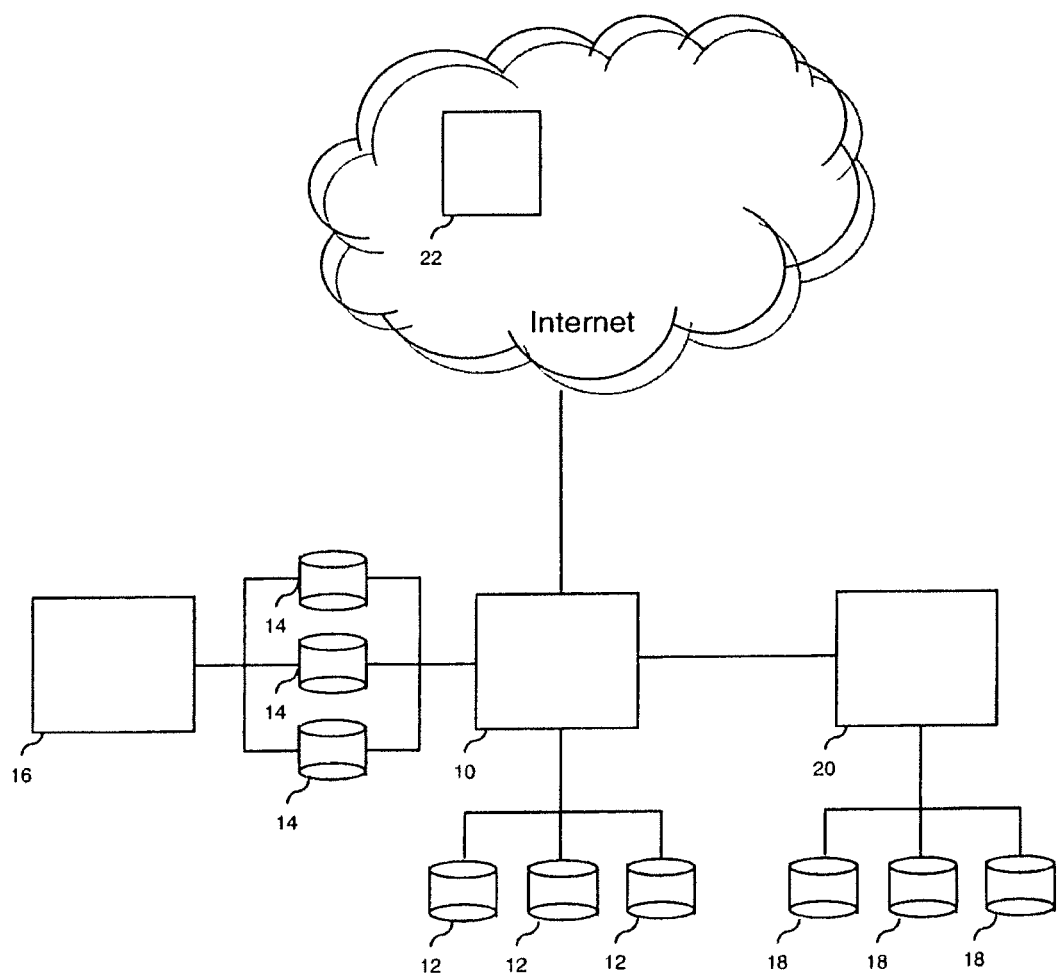
FIG. 1 is a diagram of an embodiment of a system in accordance with the invention.

FIG. 1 shows several possible configurations in which an antivirus program executing on a computer system 10 could be used to scan for viruses—on dedicated local storage devices 12, on storage devices 14 shared with another computer system 16, or on storage devices 18 associated with another computer system 20. Computer system 10 may communicate with computer system 20 or any other device via a network or other means of communication. Computer system 10 is in communication with the Internet, and may be configured to receive virus definitions/updates from an antivirus vendor 22, though it should be understood that virus definitions/updates may be received by other means such as by physical media.

In an embodiment, a scanning method employed by an antivirus program may use a file inclusion list to determine files to be scanned, in order to reduce the performance degradation period associated with antivirus scan operations while maintaining an acceptable level of protection from virus infection and damage. The method may comprise scanning only files that have changed during a defined time period. If the computer system protected by the antivirus software was free of any virus infections at the beginning of the time period, then only files that have changed during the time period are at risk for virus infection or damage. Files that have changed during the time period usually constitute a very small portion of the total files residing on computer hard drives. Modern desktop and workstation computer platforms typically have in excess of 100,000 resident files. Running an antivirus scan on all files may result in a scan operation that runs for several hours, causing performance degradation during the scan period. By scanning only changed files in accordance with the algorithm, the scan operation run time may be reduced to a few seconds or a few minutes.

The scanning methods described herein may be used with various methods of virus detection. For example, they may be used with a signature-based virus scan, in which a virus description supplied by an antivirus vendor or other source when searching a file for a previously discovered virus. A signature may comprise a unique string of bits, or the binary pattern, of all or part of a computer virus. The virus signature is akin to a fingerprint in that it can be used to detect and identify specific viruses. A heuristic virus scan may also be used, in algorithms that search for common virus behaviors may be used to detect previously unknown computer viruses. Heuristic virus scans may be platform-specific.

In an embodiment, a virus scanning method comprising "incremental scanning" may be used. The method may be used with a computer system that utilizes a change log, which provides the ability to identify significant file events on the host computer. Such events may include file actions like modification, deletion, encryption, rename, relocation, and compression. A log entry could include the date/time of the event, an indication of the affected file (such as the filename), and a description of the event action. In an embodiment, an agent on the host computer may be provided to monitor the change log and add or remove entries from file scan lists provided as input parameters to an antivirus scan operation. This may, for example, be implemented as a process or daemon that watches the change log for changes and updates file scan lists as needed. In one embodiment, a process may monitor file system operations directly for operations that alter files in ways that may result in infection of the files. This could, for example, be implemented as a trap that captures all file system operations and commands and examines them before passing them through. Events that could result in infection would cause the file (or rather, its information such as a file identifier, perhaps in the form of a file name) to be added to the file scan list. The file scan list may be implemented as a file residing on a storage device (local or remote), to be accessed by the antivirus program at scan time, or kept in memory. In an embodiment, the list could also be passed to other programs, such as the antivirus program, using an application programming interface (API).

Figure 2:
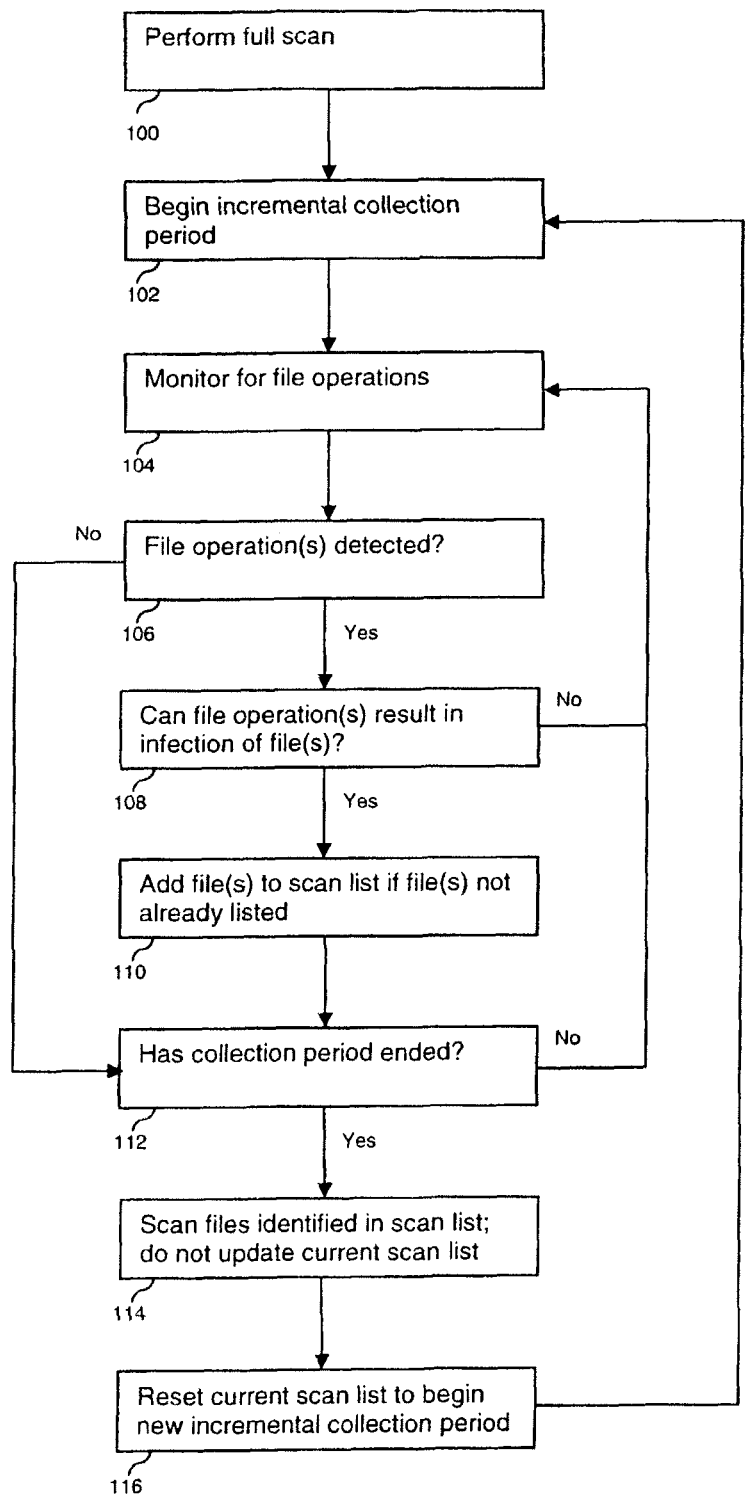
FIG. 2 is a flowchart illustrating a process for incremental scan.

FIG. 2 illustrates an embodiment of a process flow for an incremental scan. A full scan may be performed to ensure that the storage device (or a plurality of storage devices, or a portion of a storage device such as a directory or partition) is free from viruses, step 100. A full scan may be run before a file change logging service begins to capture file change events in a new or recently emptied file scan list. If a file scan list has grown extremely large for any reason, it may be desirable to clear the list and run a full scan. Scheduled virus scan operations are repeating actions initiated at a specific start time at the end of each scan interval. In an embodiment, a scheduled scan is performed, and the incremental scan interval begins after the scheduled scan. The incremental collection period runs, as shown in FIG. 2 at 102, and this may coincide with the incremental scan interval. During this time, no scan is performed. The change log is monitored for file operation events, or some other method of monitoring for file operations may be used, step 104. If a file operation is detected, step 106, it is determined whether the file operation is of a nature that could result in infection of the file, step 108. If the file operation could result in infection of the file, then in step 110, the file is added to the file scan list if it is not already listed. Thus, the file scan list is updated to indicate files that need to be scanned based on events that occur during the incremental collection period. In one embodiment, versions of files may be tracked, and thus the process would be made capable of distinguishing between versions. The file scan list could then contain multiple versions of a given file. A determination is made as to whether the incremental collection period has ended, step 112. If the incremental collection period has not ended, the process may return to monitoring for file operations, step 104. At the end of the incremental scan interval, the incremental collection period also ends, and a scheduled scan is performed using the file scan list to determine which files must be scanned, step 114. The file scan list is reset to begin a new incremental collection period, step 116, and the process returns to step 102 to start the incremental collection period. Alternatively, the files in the scan list could be marked as inactive for scanning purposes, or a new scan list could be created with a new list of files for the new collection period. It may be desired to save file scan lists, such as for administrative or analytical purposes.

In an embodiment, on demand scan operations may be initiated at any time using the file scan list; i.e., the user may initiate a scan as desired, for any reason. An on demand may reset the scan interval, as if a scheduled scan had occurred. An on demand scan may end an incremental scan interval if the on demand scan includes all files currently in the incremental scan list. In one embodiment, an on demand scan would not end a differential scan interval, except in the extreme case that the client platform has been completely restored from an uninfected backup image.

As described herein, an incremental virus scan processes the files changed during the incremental collection period. In an embodiment, an incremental scan will never scan the same version of a file more than once. The incremental collection period may be equal to the incremental scan interval such that exactly one incremental scan operation is run during a single incremental collection period. These files are identified by the contents of the incremental scan list accumulated during this interval. The current incremental scan list is frozen at the time the incremental virus scan is initiated. At the same time, the agent begins creating a new list for the next incremental scan interval. Thus, collection for the new scan list begins concurrently with the initiation of an incremental scan, and continues while the scan is performed. The goal of incremental scan operations is to discover virus infections as soon as possible after a file is modified.

The selection of a collection period and scan interval for incremental scans may in one embodiment be selected to correspond to expectations of world-wide virus origination frequency. Thus, if a new virus release occurs approximately every two hours, the incremental scan interval may be set to a value less than two hours. The interval would be short enough to provide a margin of safety.

Figure 3:
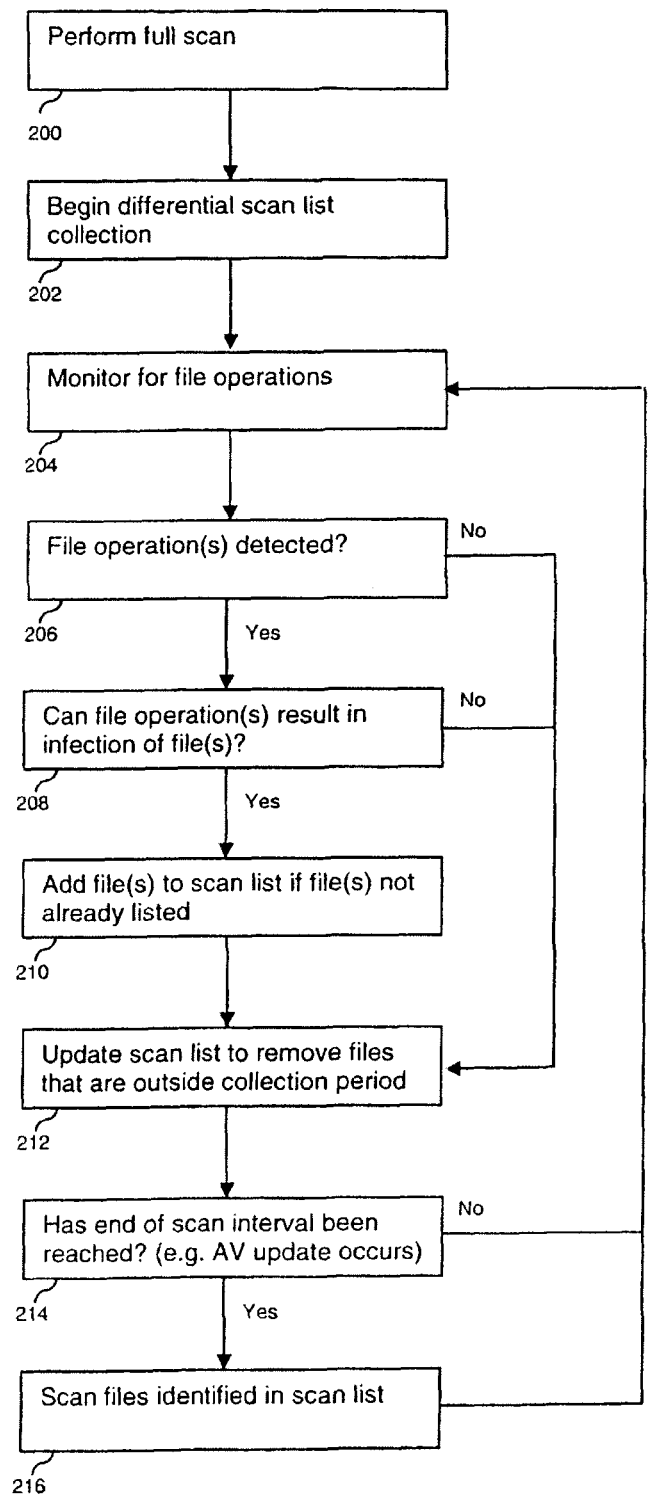
FIG. 3 is a flowchart illustrating a process for differential scan.

In one embodiment, a virus scanning method may comprise a "differential scan". A process for differential scanning is illustrated in FIG. 3. A full scan may be performed in step 200 to ensure that the storage device is free of infections. After the full scan (or optionally no scan may be done), the differential collection period may begin, and the differential scan list collection begins, step 202. A differential scan may process the files changed during the differential collection period. The change log is monitored (or other method of detecting file operations) for file operations, step 204, and if file operations are detected, step 206, it is determined whether the file operations may result in infections, step 208. If so, the files are added to the scan list if not already listed, step 210. A file may be subject to multiple file operation events during the differential collection period. A file already included in the scan list may be relocated to the top of the list during step 210 as a result of a subsequent operation. For example, a file last modified 20 days ago, would be relocated to the top of the list if subsequently reported as modified during the current inspection of the event log. Versions may be tracked in an embodiment, and multiple versions of a file may appear on the scan list. If no file operations are detected or the file operations are not considered capable of resulting in infections, the process goes to step 212. At 212, the scan list is updated to remove any files that have fallen outside the collection period. For example, if the collection period were set to 35 days, files that were last operated on (in a way that could result in infection) more than 35 days ago are removed from the scan list. Alternatively, the files in the scan list could be marked as inactive for scanning purposes, or a new scan list could be created with the updated list of files. It may be desired to save file scan lists, such as for administrative or analytical purposes. The process checks whether the end of the differential scan interval has been reached, step 214. This may be set according to a timer or occurrence of an antivirus update, for example. If the end of the differential scan interval has not yet been reached, the process returns to step 204 to monitor for file operations. If the end of the differential scan interval has been reached, the files identified in the scan list are scanned, step 216, and the process returns to step 204.

It may be desired, in an embodiment, to identify previous file operations prior to the initiation of the differential collection period. For example, if a 35-day window was set, then at the beginning of the differential collection period, it may be desired to examine file operations up to 35 days prior. In this case, the process would collect the previous file operations, proceed to determining whether the file operations may result in infection of the files in step 208, and continue as described herein.

The files are identified by the contents of the differential scan list accumulated during this period. Once a file is added to the differential scan list, the file may be scanned multiple times before the age of the file causes the file to be removed from the scan list. Additional scans are only beneficial after new virus signatures and/or new heuristic scan algorithms have been released by the antivirus product vendor. The collection period is a continuously moving time interval and the agent maintaining the differential scan list is continuously adding and removing files from the list. In an embodiment, the scan interval is always shorter than the collection period, to ensure that files that are added to the scan list will be scanned at least once before they are removed from the scan list. For example, if the collection period is ten days and the scan interval is two days, then five differential scans (10 days divided by 2 days) would be run during each collection period. Collected files modified before the start of the collection period are removed, and files that are changed during the collection period are added to the scan list. Differential scans may be used to discover files infected by previously unknown viruses during the collection period, as described herein.

In an embodiment, selection of a collection period for differential scan lists may correspond to an expected time for the antivirus product vendor (or similar antivirus resource) to discover, analyze, and release virus signatures for previously unknown computer viruses. For example, if the expected time from release of the virus to the release of virus signatures is 30 days, the collection period might be set to 35 days, adding a 5-day margin of safety. The selection of a scan interval for differential scans may correspond to automatic ("live") update operations of the virus signatures and scan engines used by antivirus products to scan for all previously discovered viruses. The scheduled differential scan operation would run immediately following successful completion of an automatic update operation. If an antivirus software vendor releases such updates once every 48 hours, the user may elect to schedule automatic updates corresponding to the vendor release schedule. In an embodiment, a differential scan would not be run unless either new virus definitions or a new version of the scan engine have been released since the previous differential scan. Otherwise, there is no value in scanning a file already scanned using the existing virus definitions and scan engine, because there is zero probability of detecting an infection.

Figure 4:
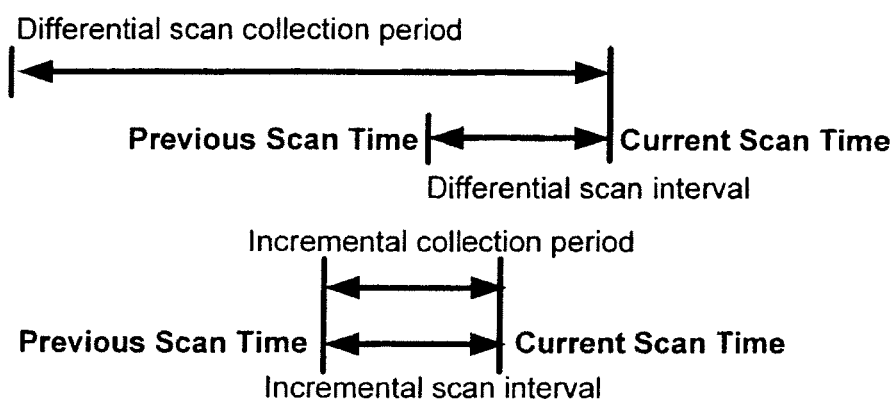
FIG. 4 is a diagram illustrating embodiments of incremental and differential scans.
Figure 5:
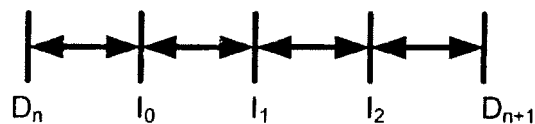
FIG. 5 is a diagram illustrating incremental and differential scans used together.

FIG. 4 illustrates a comparison of differential and incremental scans. The relationship between the differential collection period and the differential scan interval is shown, as well as the relationship between the incremental collection period and the incremental scan interval. FIG. 5 illustrates how, in one embodiment, incremental and differential scans might be used together. As shown, incremental scan intervals could be completely nested within differential scan intervals. Incremental scans may be performed during a differential scan interval. In an embodiment, the differential collection period is likely to be longer than the interval collection period, because the differential collection period is based on the frequency of updates to the scan engine or virus definitions, while the interval collection period is based on the frequency of virus releases, which is usually much higher. Performing a differential scan would also end the incremental scan interval and incremental collection period, resetting the incremental scan list, because all files that changed and are included in the incremental scan list would also be listed on the differential scan list (since they will be within the differential collection period). However, performing an incremental scan would not alter the differential scan interval or the differential scan list. Combining the incremental and differential scans has the advantage of detecting virus infections quickly, and promptly searching for previously undiscovered infections when new updates are released.

The change log and/or file scan list may be protected from unauthorized alteration, tampering, copying, viewing, and deletion. In addition, if historical versions of the change log and/or file scan list are maintained these may also be protected from unauthorized alteration, tampering, copying, viewing, and deletion.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A system for scanning objects, comprising a storage device configured to store the objects, and a processor configured to:
   determine a first scan collection period;
   monitor the system during the first scan collection period to detect object events that can result in a virus infection on the storage device, wherein object events include at least one from a group comprising modification, deletion, encryption, rename, relocation, and compression;
   update a scan list with information regarding objects associated with selected ones of the object events;
   following conclusion of the first scan collection period, scan objects on the storage device, based on the information in the scan list; and
   reset the scan list to begin a second scan collection period.

2. The system as recited in claim 1, wherein the processor is configured to determine the first scan collection period by defining a window going back in time from a current time.

3. The system as recited in claim 2, wherein the processor is further configured to remove from the scan list information regarding objects associated with object events occurring prior to the first scan collection period.

4. The system as recited in claim 3, wherein the processor is configured to monitor the computer system by monitoring a change log that is updated with information about object operations taking place.

5. The system as recited in claim 3, wherein the processor is further configured to select one of the object events by determining whether an object event may cause a condition for which the scanning is being performed.

6. The system as recited in claim 5, wherein the condition is a virus infection.

7. The system as recited in claim 3, wherein the processor is configured to update the scan list by determining whether information regarding an object is present in the scan list, and adding the information regarding the object to the scan list if it is absent.

8. The system as recited in claim 3, wherein the processor is configured to update the scan list by determining whether information regarding an object version is present in the scan list, and adding the information regarding the object version to the scan list if it is absent.

9. The system as recited in claim 8, wherein the processor is configured to update the scan list by storing in the scan list information regarding versions of an object.

10. The system as recited in claim 9, wherein the processor is configured to remove from the scan list information regarding objects associated with object events occurring prior to the first scan collection period by removing information regarding versions of objects associated with object events occurring prior to the first scan collection period.

11. The system as recited in claim 10, wherein the scan list includes information only about versions of objects associated with object events having a time of occurrence during the first scan collection period.

12. The system as recited in claim 3, wherein the processor is further configured to scan the objects upon occurrence of a triggering event.

13. The system as recited in claim 12, wherein the triggering event is a virus definition update.

14. The system as recited in claim 12, wherein the triggering event is a virus scan engine update.

15. The system as recited in claim 3, wherein the processor is configured to scan the objects by scanning for at least one virus signature.

16. The system as recited in claim 3, wherein the processor is configured to scan the objects by scanning for behavior associated with a virus infection.

17. The system as recited in claim 3, wherein defining the window includes determining a predicted time from release of a virus to release of an antivirus update relating to the virus.

18. The system as recited in claim 17, wherein defining the window includes choosing the window to be longer than the predicted time.

19. A method for scanning objects in a computer system, comprising:
   determining a first scan collection period;
   monitoring the computer system during the first scan collection period to detect object events that can result in a virus infection, wherein object events include at least one from a group comprising modification, deletion, encryption, rename, relocation, and compression;
   updating a scan list with information regarding objects associated with selected ones of the object events;
   following conclusion of the first scan collection period, scanning objects in the computer system based on the information in the scan list; and
   resetting the scan list to begin a second scan collection period.

20. A computer program product for scanning objects in a computer system, comprising a non-transitory computer usable medium having machine readable code embodied therein for:

performing a full scan;

determining a first scan collection period;

monitoring the computer system during the first scan collection period to detect object events that can result in a virus infection, wherein object events include at least one from a group comprising modification, deletion, encryption, rename, relocation, and compression;

updating a scan list with information regarding objects associated with selected ones of the object events;

following conclusion of the first scan collection period, scanning objects in the computer system based on the information in the scan list; and resetting the scan list to begin a second scan collection period.

* * * * *